(12) United States Patent
Shirai

(10) Patent No.: US 9,302,739 B2
(45) Date of Patent: Apr. 5, 2016

(54) BICYCLE POWER CONTROL APPARATUS

(75) Inventor: Toyoto Shirai, Osaka (JP)

(73) Assignee: Shimano, Inc., Osaka (JP)

( * ) Notice: Subject to any disclaimer, the term of this patent is extended or adjusted under 35 U.S.C. 154(b) by 935 days.

(21) Appl. No.: 13/525,965

(22) Filed: Jun. 18, 2012

(65) Prior Publication Data

US 2013/0334874 A1 Dec. 19, 2013

(51) Int. Cl.
| | |
|---|---|
| *B60L 1/00* | (2006.01) |
| *B60L 3/00* | (2006.01) |
| *H02G 3/00* | (2006.01) |
| *B62M 25/08* | (2006.01) |
| *B62K 25/04* | (2006.01) |

(52) U.S. Cl.
CPC .......... *B62M 25/08* (2013.01); *B62K 2025/044* (2013.01)

(58) Field of Classification Search
CPC .................. B62M 25/08; B62K 2025/044
USPC .................. 307/9.1, 10.1, 10.7; 320/126
See application file for complete search history.

(56) References Cited

U.S. PATENT DOCUMENTS

| | | | |
|---|---|---|---|
| 6,073,736 A | 6/2000 | Franklin | |
| 6,244,398 B1 | 6/2001 | Girvin et al. | |
| 6,353,304 B1 * | 3/2002 | Atcitty et al. ................. | 320/116 |
| 7,015,598 B2 | 3/2006 | Oohara | |
| 7,116,008 B2 | 10/2006 | Kitamura et al. | |
| 8,473,130 B2 * | 6/2013 | Brady et al. ..................... | 701/22 |
| 2004/0115962 A1 * | 6/2004 | Kitamura et al. ............... | 439/34 |
| 2004/0195025 A1 * | 10/2004 | Kitamura ....................... | 180/205 |
| 2005/0280244 A1 * | 12/2005 | Watarai ....................... | 280/288.4 |
| 2006/0022425 A1 * | 2/2006 | Nishimoto .................... | 280/260 |
| 2006/0122015 A1 * | 6/2006 | Takamoto et al. .............. | 474/80 |
| 2006/0186631 A1 * | 8/2006 | Ishikawa ....................... | 280/260 |
| 2006/0226879 A1 * | 10/2006 | Kitamura ....................... | 327/94 |
| 2007/0273216 A1 * | 11/2007 | Farbarik ......................... | 307/86 |
| 2010/0218633 A1 * | 9/2010 | Ichida et al. ................ | 74/473.12 |
| 2010/0244401 A1 * | 9/2010 | Hara et al. .................... | 280/261 |
| 2010/0327542 A1 * | 12/2010 | Hara et al. ................. | 280/5.503 |
| 2011/0056177 A1 * | 3/2011 | Goto ............................. | 56/14.7 |
| 2012/0326671 A1 * | 12/2012 | Krause .......................... | 320/126 |

FOREIGN PATENT DOCUMENTS

| | | |
|---|---|---|
| DE | 20 2005 010 822 U1 | 12/2005 |
| DE | 603 20 073 T2 | 6/2009 |

OTHER PUBLICATIONS

U.S. Appl. No. 13/076,960, filed Mar. 31, 2011, Ichida et al.

* cited by examiner

*Primary Examiner* — Carlos Amaya
(74) *Attorney, Agent, or Firm* — Global IP Counselors

(57) ABSTRACT

A bicycle power control apparatus comprises a power supply sensor and a controller. The power supply sensor detects a power level of a first power supply. The controller is operatively coupled to the power supply sensor to receive a power level signal from the power supply sensor. Thus, the controller selectively operates a bicycle component actuator using power from the first power supply while the power level of the first power supply is detected at or above a first power level, and automatically sets the bicycle component actuator using power from a second power supply to a prescribed operating condition in response to detection of the power level of the first power supply being below the first power level.

26 Claims, 4 Drawing Sheets

BICYCLE POWER CONTROL APPARATUS

BACKGROUND

1. Field of the Invention

This invention generally relates to a bicycle power control apparatus. More specifically, the present invention relates to a bicycle power control apparatus that automatically sets a bicycle component actuator using power from a first or second power supply depending on the power level of the first power supply.

2. Background Information

In recent years, some bicycles are provided with electrically adjustable components. Examples of some these electrically adjustable components include suspensions, derailleurs and a seatpost. Often these electrically adjustable components are provided with an electric unit that includes such parts as a motor or other drive device for adjusting the electrically adjustable component and a position sensor for detecting a position of the electrically adjustable component. Typically, bicycles equipped with electrically adjustable components are also provided with a main electrical power supply, such as a battery or a generator, for supply electrical energy to all of the electrically adjustable components.

However, if the main electrical power supply used to power these devices becomes depleted, the devices may become inoperable.

SUMMARY

In view of the state of the known technology, a bicycle power control apparatus is provided that basically comprises a power supply sensor and a controller. The power supply sensor detects a power level of a first power supply. The controller is operatively coupled to the power supply sensor to receive a power level signal from the power supply sensor. Thus, the controller selectively operates a bicycle component actuator using power from the first power supply while the power level of the first power supply is detected at or above a first power level, and automatically sets the bicycle component actuator using power from a second power supply to a prescribed operating condition in response to detection of the power level of the first power supply being below the first power level.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
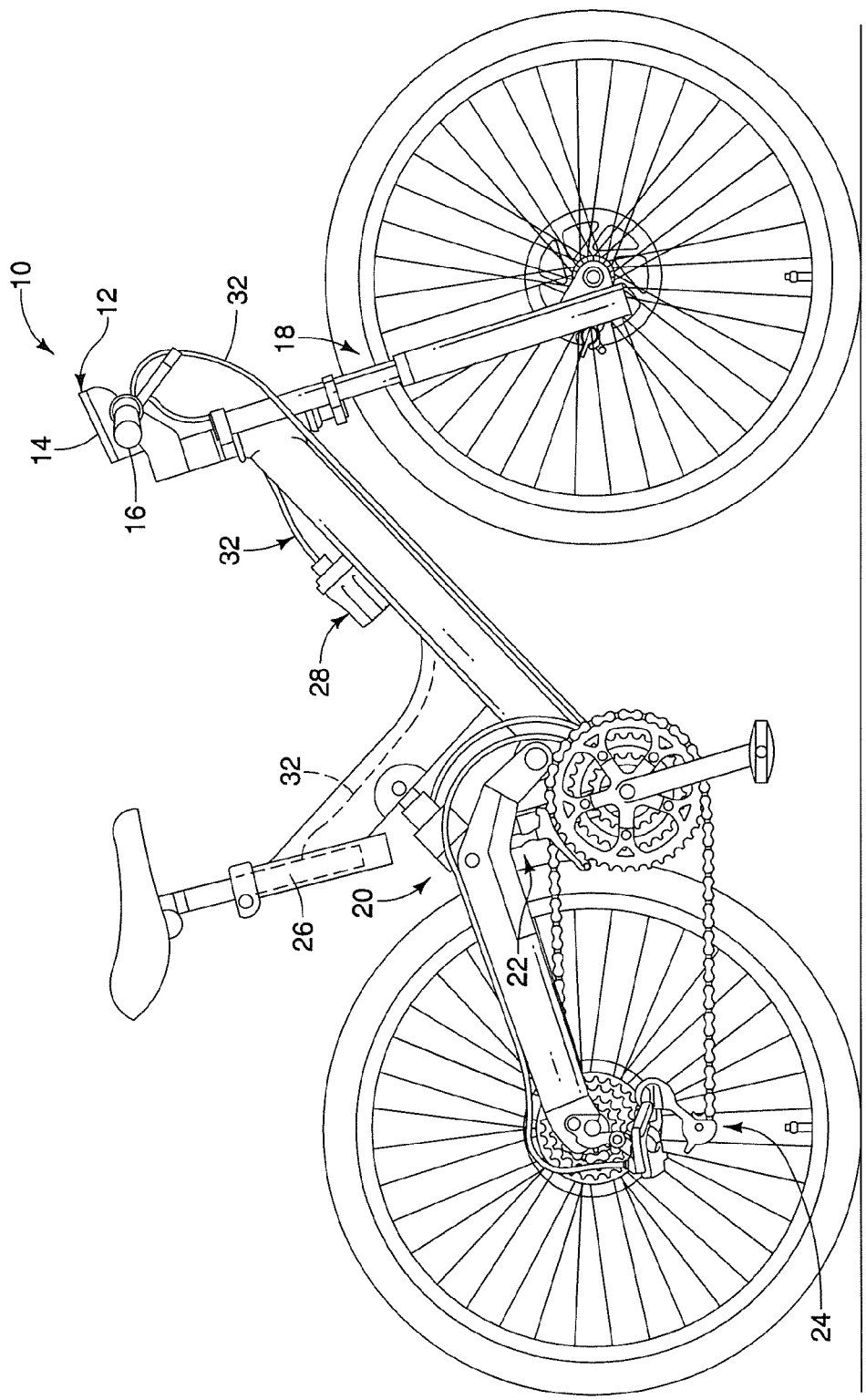
FIG. 1 is a side elevational view of a bicycle that is equipped with a bicycle power control apparatus in accordance with one embodiment.

Referring initially to FIG. 1, a bicycle 10 is illustrated that is equipped with a bicycle power control apparatus 12 having a control unit 14 that is mounted on a handlebar 16. As discussed in more detail below, the control unit 14 is operable to control an electrically adjustable front suspension 18 and an electrically adjustable rear suspension 20, an electrically operable front derailleur 22 and an electrically operable rear derailleur 24, and an electrically adjustable seat post 26 in accordance with a disclosed embodiment.

The bicycle power control apparatus 12 is also provided with a first or main power supply 28 (e.g., a battery as shown) for supplying electrical power to the control unit 14 and to the electrically adjustable front and rear suspensions 18 and 20, the electrically operable front and rear derailleurs 22 and 24, and the electrically adjustable seat post 26. The battery can be, for example, a nickel hydrogen battery or a lithium ion battery, or any other suitable type of battery. However, the power supply 28 is not limited to a battery as the power supply 28. Rather, for example, a generator by itself or a generator with a battery can be used for the power supply 28. Other than the bicycle power control apparatus 12, as explained below, the bicycle 10 can have any type of suitable bicycle components. Thus, the parts of the bicycle 10 will not be discussed herein, except for those parts that will assist in the understanding of the bicycle power control apparatus 12.

As explained below in more detail, the control unit 14 is configured to selectively change various setting states of the front and rear suspensions 18 and 20 in response to a manual input from a rider or an automatic input from a control program in the control unit 14. In other words, the control unit 14 is configured to selectively change at least one electrically adjustable suspension parameter of each of the front and rear suspensions 18 and 20 either manually or automatically. The control unit 14 is also configured to selectively change the gear positions of the front and rear derailleurs 22 and 24 in response to a manual input from a rider or an automatic input from a control program in the control unit 14. Thus, the control unit 14 is configured to selectively change at least one electrically adjustable parameter of each of the front and rear derailleurs 22 and 24 either manually or automatically. Furthermore, the control unit 14 is configured to selectively change the height position of the seat post 26 in response to a manual input from a rider or an automatic input from a control program in the control unit 14. Thus, the control unit 14 is configured to selectively change at least one electrically adjustable parameter of the seat post 26 either manually or automatically.

Figure 3:
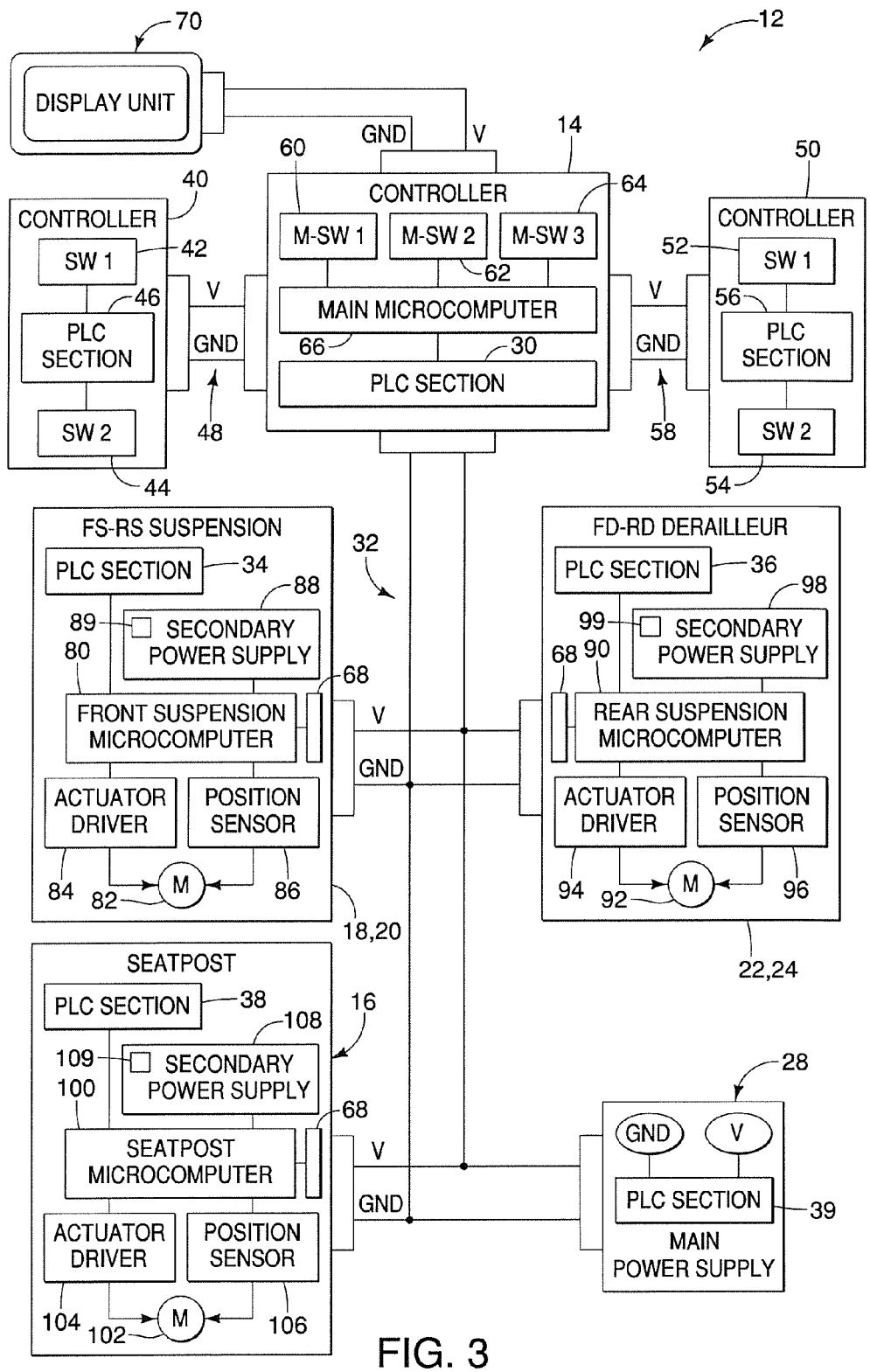
FIG. 3 is a schematic block diagram showing an exemplary configuration of the bicycle power control apparatus.

In the block diagram of FIG. 3, the front and rear suspensions 18 and 20 have basically the same features and thus are represented as a single suspension 18, 20. Likewise, the front and rear derailleurs 22 and 24 have basically the same features and thus are represented as a single derailleur 22, 24. The seat post is represented as a seat post 26 as indicated. The control unit 14 in this example is provided with an electric power line communication (PLC) section 30 that is configured to execute communication by PLC (power line communications).

That is, the control unit 14 executes two-way communications via PLC section 30 through an electric power line 32 with an electric power line communication section 34 of the front and rear suspensions 18 and 20, an electric power line communication section 36 of the front and rear derailleurs 22 and 24, an electric power line communication section 38 of the seat post 26, and an electric power line communication section 39 of the power supply 28. Thus, control signals that control the front and rear suspensions 18 and 20, the front and rear derailleurs 22 and 24, and the seat post 26 are superimposed on the power source voltage in the electric power line 32 that interconnect the control unit 14, the front and rear suspensions 18 and 20, the front and rear derailleurs 22 and 24, the seat post 26 and the power supply 28. In this way, data and power can be transmitted between the control unit 14 and the front and rear suspensions 18 and 20, the front and rear derailleurs 22 and 24, the seat post 26 and the power supply 28 by the electric power line 32. The electric power line 32 includes at least a ground wire and a voltage line that are connected between each of the electrical components. Optionally, instead of using power line communications (PLC), in addition to a ground wire GND and a voltage wire V, separate signal wires POS, FSS and RSS can be provided for transmitting data as needed and/or desired. In any event, the power supply 28 can be viewed as a first power supply that is coupled to a bicycle component, such as the front and rear suspensions 18 and 20, the front and rear derailleurs 22 and 24, and the seat post 26, by an external power cord, such as the electric power line 32, to remotely dispose the first power supply from the bicycle component.

Figure 2:
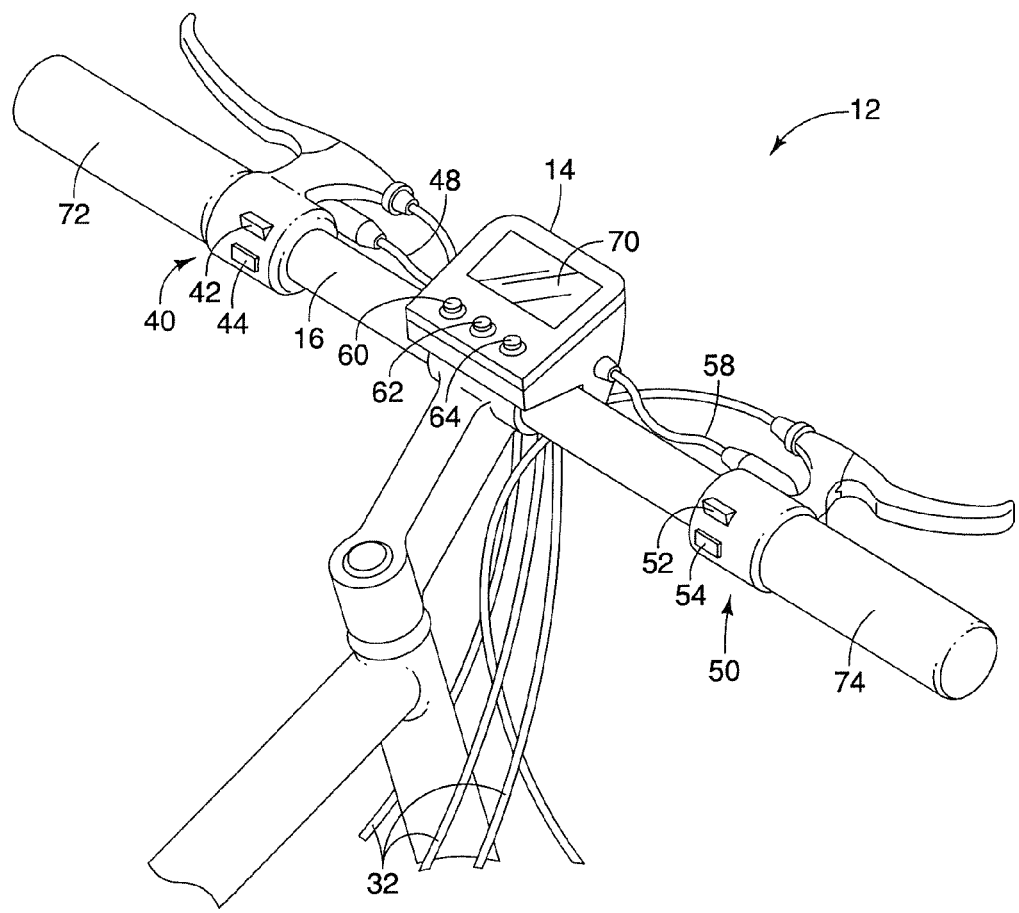
FIG. 2 is a perspective view of the handlebar area of the bicycle illustrated in FIG. 1, with a controller and switches mounted to a straight type handlebar.

The bicycle power control apparatus 12 in this example further includes a first switch pair 40 including a first switch 42 and a second switch 44, and a second switch pair 50 including a first switch 52 and a second switch 54. These switches 42, 44, 52 and 54 are electrically connected to the control unit 14, which is mounted on the handlebar 16 of the bicycle 10 as seen in FIG. 2. Preferably, the switches 42, 44, 52 and 54 are provided with an electric power line communication sections 46 and 56 to execute two-way communications through the electric power lines with the electric power line communication section 30 of the control unit 14. In this way, data can be transmitted from the switches 42, 44, 52 and 54 to the control unit 14 by electric power lines 48 and 58. Each of the electric power lines 48 and 58 in this example includes at least a ground wire and a voltage line. Optionally, in addition to a ground wire GND and a voltage wire V, separate signal wires POS can be provided for transmitting data as needed and/or desired.

In addition, as seen in the embodiment of FIG. 2, the control unit 14 is mounted on the handlebar 16 of the bicycle 10 at near the center of the handlebar 16. However, the control unit 14 can be mounted in other locations as needed and/or desired. Moreover, in FIG. 2, the switches 42, 44, 52 and 54 are illustrated as being remotely connected to the control unit 14. However, it may be desirable to have the switches 42, 44, 52 and 54 integrated with the housing of the control unit 14. Alternatively, data can be transmitted between the switches 42, 44, 52 and 54 and the control unit 14 by wireless communication devices. Thus, the term "signal" as used herein is not limited to an electrical signal, but includes other types of signals such as a command.

While each of the switches 42, 44, 52 and 54 are illustrated as being a push button type of switch, it will be apparent from this disclosure that other types of switches can be used. For example, a single toggle switch can be used for performing the function of two of the switches. For instance, depending on the type of suspensions, a single switch can be used to control both the front and rear suspensions 18 and 20 simultaneously. Thus, a single switch can be provided to simultaneously change both the front and rear suspensions 18 and 20 between a lockout state and a non-lockout state.

In the illustrated embodiment, three mode switches 60, 62 and 64 are electrically connected to the control unit 14 for controlling operation modes of control unit 14 and operation modes of the switches 42, 44, 52 and 54. The switches 42, 44, 52 and 54 are thus multifunctional depending on the mode in which they are set. For example, as understood in the art, one or more of the mode switches 60, 62 and 64 can be used to set switches 42 and 44 to control the front suspension 18 and to set switches 52 and 54 to control the rear suspension 20. Also, one or more of the mode switches 60, 62 and 64 can be used to set switches 42 and 44 to control the front derailleur 20 and to set switches 52 and 54 to control the rear derailleur 20. Furthermore, one or more of the mode switches 60, 62 and 64 can be used to set switches 42 and 44, switches 52 and 54, or the other one or two of the mode switches to control the seat post 26. In addition, one or more of the mode switches can be used to set the operating parameters of the front and rear suspensions 18 and 20, the front and rear derailleurs 22 and 24, and the seat post 26 as discussed in more detail below. While the mode switches 60, 62 and 64 are illustrated as being integrated with the housing of the control unit 14, one or more of the mode switches 60, 62 and 64 can be remotely located from the control unit 14.

In the illustrated embodiment, the control unit 14 further includes a main controller 66, such as a microcomputer. In the control unit 14, the controller 66 includes other a central processing unit (CPU) and other conventional components such as an input interface circuit, an output interface circuit, and storage devices such as a ROM (Read Only Memory) device and a RAM (Random Access Memory) device. The controller 66 can be provided with various control programs that control the front and rear suspensions 18 and 20, the front and rear derailleurs 22 and 24, the seat post 26 and other components of the bicycle 10. For example, the controller 66 includes manual control programs for manually controlling these components, as well as automatic control programs for automatically controlling these components. It will be apparent to those skilled in the art from this disclosure that the precise structure and algorithms for the control unit 14 can be any combination of hardware and software that will carry out the functions of the present invention.

Furthermore, in the illustrated embodiment, a power supply sensor 68 is disposed at each of the front and rear suspensions 18 and 20, at the front and rear derailleurs 22 and 24, and at the seat post 26. Alternatively or in addition, a power supply sensor 68 can be disposed at the control unit 14 and at the power supply 28 as needed and/or desired. Moreover, the power supply sensor 68 includes at least one sensor element, but can be made of several sensor elements as needed and/or desired. Also the power supply sensor 68 can be formed as a part of the controller 66 or microcomputer as needed and/or desired.

The control unit 14 can also include or be coupled to a display unit 70 that can be integral with the control unit 14 or mounted to the handlebar 16 or at any other suitable location on the bicycle 10. Preferably, the display unit 70 indicates the current voltage or power level of the power supply 28 as detected by the power supply sensor 68, as well as any other suitable information as understood in the art. In the illustrated embodiment, for example, the power supply sensor 68 includes a voltage sensor for determining the power level of the power supply 28. Moreover, instead of or in addition to setting any of switches 42, 44, 52 and 54 as discussed above, one or more of the mode switches 60, 62 and 64 can control the display unit 70 to display a touch screen, for example, which enables a user to control any of the bicycle components, such as the front and rear suspensions 18 and 20, the front and rear derailleurs 22 and 24, and the seat post 26.

In one example, the mode switches 60, 62 or 64 are used to set the switches 42, 44, 52 and 54 to control the front and rear suspensions 18 and 20. In this event, the front suspension 18 can be manually controlled by the first switch 42 for setting a first electrically adjustable suspension parameter (e.g., a lockout state, a first damping rate and a first travel-stroke length) of the front suspension 18 and the second switch 44 for setting a second electrically adjustable suspension parameter (e.g., a non-lockout state, a second damping rate and a second travel-stroke length) of the front suspension 18. Similarly, the rear suspension 22 is manually controlled by the first switch 52 for setting a first electrically adjustable suspension parameter (e.g., a lockout state, a first damping rate and a second travel-stroke length) of the rear suspension 20 and the second switch 54 for setting a second electrically adjustable suspension parameter (e.g., a non-lockout state) of the rear suspension 20.

In another example, the mode switches 60, 62 or 64 are used to set the switches 42, 44, 52 and 54 to control the front and rear derailleurs 18 and 20. In this event, the front derailleur 18 can be manually controlled by the first switch 42 for upshifting and by the second switch 44 for downshifting. Similarly, the rear derailleur 24 can be manually controlled by the second switch 54 for upshifting and by the second switch 56 for downshifting. Alternatively, the shifters for the front and rear derailleurs 22 and 24 can be disposed in the hand grips 72 and 74, or at any other suitable location, and can communicate with the control unit 14 as understood in the art.

As further shown in FIG. 3 and as understood by one skilled in the art, each of the front and rear suspensions 18 and 20 in this example further includes a controller 80 (e.g., a microcomputer), an actuator 82 (e.g, a motor), an actuator driver 84, a position sensor 86 and a secondary power supply 88. The microcomputer of controller 80 can include features similar to those of microcomputer 66 as discussed above. Also, the secondary power supply 88 can include, for example, a battery as in power supply 28 and capacitive element 89 that is configured to store a charge. That is, the battery can be, for example, a nickel hydrogen battery or a lithium ion battery, or any other suitable type of battery. However, the secondary power supply 88 is not limited to a battery as the power supply 88, but can include other types of power supplies such as a generator and so on as discussed above with regard to power supply 28. The capacitive element 89 can be, for example, an electrolytic condenser. The secondary power supply 88 can be disposed separately from a housing of the front and rear suspensions 18 and 20, but preferably is disposed on a housing of the front and rear suspensions 18 and 20 or inside of a housing of the front and rear suspensions 18 and 20. Also, the power supply sensor 68 at each of the front and rear suspensions 18 and 20 can be formed as a part of the controller 80 or microcomputer as needed and/or desired.

Similarly, each of the front and rear derailleurs 22 and 24 in this example further includes a controller 90, such as a microcomputer as discussed above, an actuator 92 such as a motor, an actuator driver 94, a position sensor 96 and a secondary power supply 98 including a capacitive element 99 that is configured to store a charge. Thus, the components of the front and rear derailleurs 22 and 24 are similar to the corresponding components in the front and rear suspensions 18 and 20 as discussed above. Also, the power supply sensor 68 at each of the front and rear derailleurs 22 and 24 can be formed as a part of the controller 90 or microcomputer as needed and/or desired. Likewise, the seat post 26 includes a controller 100, such as a microcomputer as discussed above, an actuator 102 such as a motor, an actuator driver 104, a position sensor 106 and a secondary power supply 108 including a capacitive element 109 that is configured to store a charge. Thus, the components of the seat post 26 are similar to the corresponding components in the front and rear suspensions 18 and 20 as discussed above. Also, the power supply sensor 68 at the seat post 68 can be formed as a part of the controller 100 or microcomputer as needed and/or desired.

Figure 4:
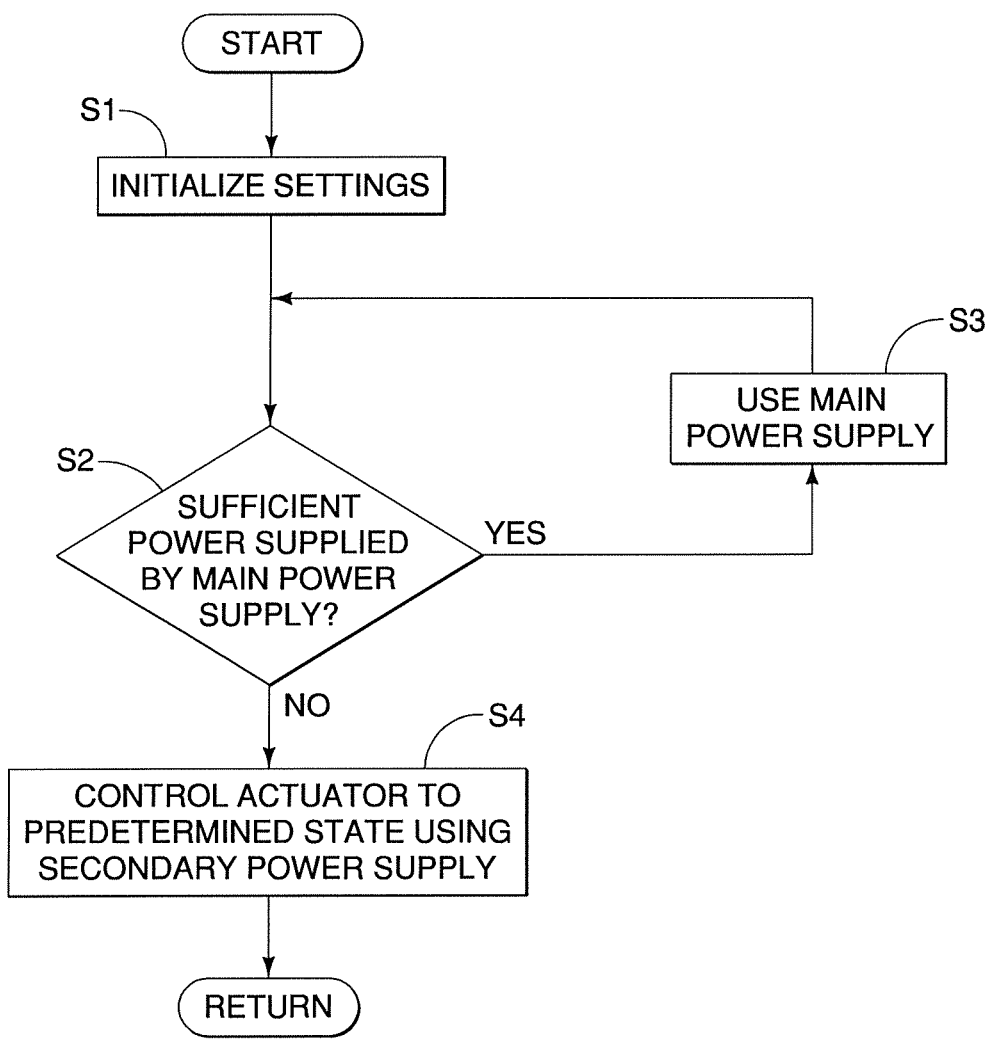
FIG. 4 is a flowchart showing exemplary operations performed by the bicycle power control apparatus.

An example of operations of the bicycle suspension control apparatus 12 will now be discussed with regard to FIGS. 1 through 3 and the flowchart in FIG. 4. As indicated in FIG. 4, any of the mode switches can be used to set the operating parameters of the front and rear suspensions 18 and 20, the front and rear derailleurs 22 and 24, and the seat post 26 in step S1. For instance, any of the mode switches 60, 62 and 64 can be used to set prescribed operating conditions at which the front and rear suspensions 18 and 20, the front and rear derailleurs 22 and 24, and the seat post 26 are to operate when, for example, the power provided by the power supply 28 becomes insufficient to fully operate these components. In this example, the controllers 80, 90 and 100 of the front and rear suspensions 18 and 20, the front and rear derailleurs 22 and 24 and the seat post 26 use the power supplied from the power supply 28 to update the operating parameters as set by the mode switches.

As described above, the bicycle power control apparatus 12 includes a power supply sensor, such as one of the power supply sensors 68, that detects a power level of a first power supply which can be, for example, main power supply 28. As further described, a controller, such as the controller 80, 90 or 100 of the front and rear suspensions 18 and 20, the front and rear derailleurs 22 and 24 or the seat post 26, is operatively coupled to one of the respective power supply sensors 68 as indicated to receive a power level signal from that power supply sensor 68. The controllers 80, 90 and 100 of the front and rear suspensions 18 and 20, the front and rear derailleurs 22 and 24 or the seat post 26 are each electrically coupled to one of the respective secondary power supplies 88, 98 and 108, so even if the electric power cannot be supplied via the electric power line 32, the controllers 80, 90 and 100 can continue to perform their respective processing operations. Alternatively the controller 80, 90 or 100 of the front and rear suspensions 18 and 20, the front and rear derailleurs 22 and 24 or the seat post 26 may automatically change a power source from the main power supply 28 to the secondary power supply 88 to maintain the processing if the power lever of the power supply 28 is decreased to below first power level. Thus, in step S2, the controller 80, 90 or 100 determines whether the power level of the first power supply 28 is detected to be at or above a first power level. As can be appreciated from the above, this first power level can be preset and adjusted using any of the mode switches 60, 62 and 64.

While the power level of the first power supply 28 is detected to be at or above the first power level, the controller 80, 90 or 100 selectively operates a bicycle component actuator using power from the first power supply in step S3. The bicycle component actuator can be the actuator 82 of either or both of the front and rear suspensions 18 and 20, the actuator 92 of either or both of the front and rear derailleurs 22 and 24, or the actuator 102 of the seat post 26 as discussed above.

However, when the power level of the first power supply 28 is detected in step S2 to have decreased to below the first power level, the controller 80, 90 or 100 automatically sets the bicycle component actuator 82, 92 or 102 using power from a secondary power supply to a prescribed operating condition in step S4 in response to the detection of the power level of the first power supply 28 being below the first power level. The secondary power supply can be secondary power supply 88 of either or both of the front and rear suspensions 18 and 20, the secondary power supply 98 of either or both of the front and rear derailleurs 22 and 24, or the secondary power supply 108 of the seat post 26 as discussed above. Furthermore, as discussed above, each of the secondary power supplies 88, 98 and 108 can include a capacitive element, such as capacitive element 89, 99 or 109, that is configured to store a charge. Therefore, the controller 80, 90 or 100 can use the charge stored in the capacitive element 89, 99 or 109 to operate the bicycle component actuator to the prescribed operating condition.

It should also be noted that in step S4, the controller 80, 90 or 100 can detect a state of the bicycle component actuator 82, 92 or 102 in response to detection of the power level of the first power supply 28 being below the first power level. The controller 80, 90 or 100 thus operates the bicycle component actuator 82, 92 or 102 using the secondary power supply 88, 98 or 108 to maintain the detected state of the bicycle component actuator 82, 92 or 102 as the prescribed operating condition while the detected state of the bicycle component actuator 82, 92 or 102 corresponds to the prescribed operating condition.

For example, the bicycle component being controlled can be the front bicycle suspension 18 or the rear bicycle suspension 20. Thus, the controller 80 can operate the bicycle component actuator 82 using the secondary power supply 88 to set the front bicycle suspension 18 or the rear bicycle suspension 20 to a free state as the prescribed operating condition. Alternatively, the controller 80 can operate the bicycle component actuator 82 using the secondary power supply to set the front bicycle suspension 18 or the rear bicycle suspension 20 to a prescribed damping force among possible damping force states as the prescribed operating condition. For instance, the controller 80 can set the front bicycle suspension 18 or the rear bicycle suspension 20 to a middle damping force among the possible damping forces as the prescribed operating condition. Also, the controller 80 can operate the bicycle component actuator 82 using the secondary power supply 88 to set the front bicycle suspension 18 or the rear bicycle suspension 20 to a prescribed suspension height position among possible suspension height positions as the prescribed operating condition. For example, the controller 80 can set the front bicycle suspension 18 or the rear bicycle suspension 20 to a middle suspension height position among the possible suspension height positions as the prescribed operating condition.

The bicycle component could also be a bicycle derailleur, such as one of the front and rear derailleurs 22 and 24. Thus, the controller 90 can operate the bicycle component actuator 92 using the secondary power supply 98 to set a gear position of the front bicycle derailleur 22 or the rear bicycle derailleur 24 to a prescribed gear position among possible gear positions as the prescribed operating condition. For example, the controller 90 can operate the bicycle component actuator 92 using the secondary power supply 98 to set a gear position of the front bicycle derailleur 22 or the rear bicycle derailleur 24 to a middle gear position among possible gear positions as the prescribed operating condition.

In addition, the bicycle component could be the bicycle seat 26. Therefore, the controller 100 can operate the bicycle component actuator 102 using the secondary power supply 108 to set a position of the bicycle seat 26 to a prescribed seat position among possible seat positions as the prescribed operating condition. For example, the controller 100 can operate the bicycle component actuator 102 using the secondary power supply 108 to set a position of the bicycle seat 26 to a middle seat position among possible seat positions as the prescribed operating condition.

In addition, the controller 80, 90 or 100 can use the first power supply 28 to charge the secondary power supply 88, 98 or 108 while the power level of the first power supply 28 is detected at or above a second power level which is above the first power level. Thus, the secondary power supplies 88, 98 and 108 can remain adequately charged. As can be appreciated from the above, the charge capacity of each of the secondary power supplies 88, 98 and 108 is smaller than the charge capacity of main power supply 28. The respective charge capacity of each of the secondary power supplies 88, 98 and 108 can be determined base on anticipated number of times that their associated bicycle component actuator 82, 92 or 102 may need to be actuated during a period when the power level of the first power supply 28 is below the first power supply level as discussed above. The actuating times can range from, for example, one time, such as for the actuator 82 of the front and rear suspensions 18 and 20 and the actuator 102 of the seat post 26, to ten or more times for the actuator 92 of the front and rear derailleurs 22 and 24. Thus, the secondary power supplies 88, 98 and 108 do not require a large capacity battery and/or condenser.

It should be further noted that any of the controllers 66, 80, 90 and 100 alone or in combination can perform the operations discussed above. Thus, the controller 66, or the controller 80, 90 or 100 of the component that is being controlled (e.g., the front or rear suspension 18 or 20, the front or rear derailleur 22 or 24, or the seat post 26), can be operatively coupled to the power supply sensor 68 or another power supply sensor to receive a power level signal from the power supply sensor 68 or other power supply sensor. The controller 66, 80, 90 or 100 can thus selectively operate the bicycle component actuator 82, 92 or 102 using power from the first power supply 28 while the power level of the first power supply 28 is detected at or above a first power level, and automatically set the bicycle component actuator 82, 92 or 102 using power from a secondary power supply (e.g., power supply 88, 98 or 108) to a prescribed operating condition in response to detection of the power level of the first power supply 28 being below the first power level. Moreover, any of the secondary power supplies 88, 98 and 108 can function as a first power supply. In this event, the power supply sensor 68, or another power supply sensor, senses the power level of that secondary power supply 88, 98 or 108, and the controller 66, 80, 90 or 100 performs the operations as discussed above to supply power to the component from one of the other secondary power supplies 88, 98 or 108 when the power level falls below the first power level.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle power control apparatus comprising:
    a power supply sensor that detects a power level of a first power supply being configured to be disposed on a bicycle frame; and
    a controller operatively coupled to the power supply sensor to receive a power level signal from the power supply sensor,
    the controller configured to selectively operate a bicycle component actuator using power from the first power supply while the power level of the first power supply is detected at or above a first power level, and configured to automatically set the bicycle component actuator using power from a second power supply to a prescribed operating condition in response to detection of the power level of the first power supply being below the first power level, the second power supply being configured to be disposed on a bicycle component having the bicycle component actuator.

2. The bicycle power control apparatus according to claim 1, wherein
    the controller is further configured to use the first power supply to charge the second power supply while the power level of the first power supply is detected at or above a second power level.

3. The bicycle power control apparatus according to claim 2, wherein
    the second power supply includes a capacitive element that is configured to store a charge.

4. The bicycle power control apparatus according to claim 3, wherein
    the controller is configured to use the charge stored in the capacitive element to operate the bicycle component actuator to the prescribed operating condition.

5. The bicycle power control apparatus according to claim 1, further comprising
    the bicycle component that includes the bicycle component actuator.

6. The bicycle power control apparatus according to claim 5, wherein
    the bicycle component includes the controller.

7. The bicycle power control apparatus according to claim 5, wherein
    the first power supply is coupled to the bicycle component by an external power cord to remotely dispose the first power supply from the bicycle component.

8. The bicycle power control apparatus according to claim 5, wherein
    the bicycle component corresponds to a bicycle suspension.

9. The bicycle power control apparatus according to claim 8, wherein
    the controller is configured to operate the bicycle component actuator using the second power supply to set the bicycle suspension to a free state as the prescribed operating condition.

10. The bicycle power control apparatus according to claim 8, wherein
    the controller is configured to operate the bicycle component actuator using the second power supply to set the bicycle suspension to a prescribed damping force among possible damping force states as the prescribed operating condition.

11. The bicycle power control apparatus according to claim 10, wherein
    the controller is configured to set the bicycle suspension to a middle damping force among the possible damping forces as the prescribed operating condition.

12. The bicycle power control apparatus according to claim 8, wherein
    the controller is configured to operate the bicycle component actuator using the second power supply to set the bicycle suspension to a prescribed suspension height position among possible suspension height positions as the prescribed operating condition.

13. The bicycle power control apparatus according to claim 12, wherein
    the controller is configured to set the bicycle suspension to a middle suspension height position among the possible suspension height positions as the prescribed operating condition.

14. The bicycle power control apparatus according to claim 5, wherein
    the bicycle component corresponds to a bicycle derailleur.

15. The bicycle power control apparatus according to claim 14, wherein
    the controller is configured to operate the bicycle component actuator using the second power supply to set a gear position of the bicycle derailleur to a prescribed gear position among possible gear positions as the prescribed operating condition.

16. The bicycle power control apparatus according to claim 14, wherein
    the controller is configured to operate the bicycle component actuator using the second power supply to set a gear position of the bicycle derailleur to a middle gear position among possible gear positions as the prescribed operating condition.

17. The bicycle power control apparatus according to claim 5, wherein
    the bicycle component corresponds to a bicycle seat post.

18. The bicycle power control apparatus according to claim 17, wherein
    the controller is configured to operate the bicycle component actuator using the second power supply to set a position of the bicycle seat to a prescribed seat position among possible seat positions as the prescribed operating condition.

19. The bicycle power control apparatus according to claim 17, wherein
    the controller is configured to operate the bicycle component actuator using the second power supply to set a position of the bicycle seat to a middle seat position among possible seat positions as the prescribed operating condition.

20. The bicycle power control apparatus according to claim 5, further comprising
another bicycle component that includes another controller configured to selectively operate another bicycle component actuator while the power level of the first power supply is detected at or above the first power level, and configured to operate the another bicycle component actuator using the second power supply to a prescribed operating condition in response to detection of the power level of the first power supply being below the first power level.

21. The bicycle power control apparatus according to claim 5, further comprising
another bicycle component that includes another controller configured to selectively operate another bicycle component actuator while the power level of the first power supply is detected at or above the first power level, and configured to operate the another bicycle component actuator using a third power supply to a prescribed operating condition in response to detection of the power level of the first power supply being below the first power level.

22. The bicycle power control apparatus according to claim 21, wherein
the another bicycle component includes the another bicycle component actuator.

23. The bicycle power control apparatus according to claim 21, wherein
the controller and the another controller are configured to use the first power supply for power to selectively operate the bicycle component actuator and the another bicycle component actuator, respectively.

24. The bicycle power control apparatus according to claim 1, wherein
the controller is configured to detect a state of the bicycle component actuator in response to detection of the power level of the first power supply being below the first power level, and to operate the bicycle component actuator using the second power supply to maintain the detected state of the bicycle component actuator as the prescribed operating condition while the detected state of the bicycle component actuator corresponds to the prescribed operating condition.

25. A bicycle power control method comprising:
detecting a power level of a first power supply configured to be disposed on a bicycle frame using a power supply sensor,
operating an electrical bicycle component actuator of an electrical bicycle component using power from the first power supply while the power level of the first power supply is detected at or above a first power level, and
automatically operating a controller to set the electrical bicycle component actuator of the electrical bicycle component using power from a second power supply configured to be disposed on a bicycle component having the bicycle component actuator to a prescribed operating condition in response to detection of the power level of the first power supply being below the first power level.

26. A bicycle power control apparatus comprising:
a power supply sensor that detects a power level of a first power supply;
a bicycle component including a bicycle component actuator, the bicycle component being at least one of a bicycle suspension, a bicycle derailleur and a bicycle seat post; and
a controller operatively coupled to the power supply sensor to receive a power level signal from the power supply sensor, the controller configured to selectively operate the bicycle component actuator using power from the first power supply while the power level of the first power supply is detected at or above a first power level, and configured to automatically set the bicycle component actuator using power from a second power supply to a prescribed operating condition in response to detection of the power level of the first power supply being below the first power level.

* * * * *